United States Patent [19]

Behrle

[11] Patent Number: 4,565,025
[45] Date of Patent: Jan. 21, 1986

[54] FISHING POLE MOUNT

[76] Inventor: William L. Behrle, 385 Grand Terrace Ct., Fenton, Mo. 63026

[21] Appl. No.: 559,299

[22] Filed: Dec. 8, 1983

Related U.S. Application Data

[63] Continuation-in-part of Ser. No. 481,839, Apr. 4, 1983.

[51] Int. Cl.[4] ............................................. A01K 97/10
[52] U.S. Cl. ................................................... 43/21.2
[58] Field of Search ...................... 43/15, 16, 17, 21.2; 248/520, 530, 535, 538

[56] References Cited

U.S. PATENT DOCUMENTS

| | | | |
|---|---|---|---|
| 1,719,695 | 7/1929 | Ferguson | 43/21.2 |
| 2,360,402 | 10/1944 | Determan | 43/21.2 |
| 2,494,476 | 1/1950 | Goetter | 248/538 |
| 3,033,502 | 5/1962 | Silver | 248/538 |
| 3,246,865 | 4/1966 | Latimer | 43/21.2 |
| 3,259,346 | 7/1966 | Rogers | 43/21.2 |
| 3,570,793 | 3/1971 | Shockel | 43/21.2 |
| 3,586,274 | 6/1971 | Hart | 248/530 |
| 3,669,390 | 6/1972 | Nielson | 43/21.2 |
| 3,964,706 | 6/1976 | Adams | 43/21.2 |

OTHER PUBLICATIONS

Goldberg's Marine, p. 204, Jan. 16, 1978, 1978 Discount Accessory Catalog.

Primary Examiner—Nicholas P. Godici
Assistant Examiner—M. Jordan
Attorney, Agent, or Firm—Rogers, Howell, Renner, Moore & Haferkamp

[57] ABSTRACT

A fishing pole mount comprising a helical coil and an integral shank, removably inserted into a small socket depending from a plate, to be used on boats without leaving parts projecting upwardly when not in use, and which is of a sufficiently small size that it can be used in different places around the gunwales of the boat. The socket may be vertical, in which event the shank is bent at an appropriate angle. In either case, there may be a lug pinched out of the side of the shank upward from the bottom end of the shank and engages in a notch in the side of the socket to prevent the rotation of the pole and coil and to limit the movement of the shank into the socket.

1 Claim, 7 Drawing Figures

U.S. Patent  Jan. 21, 1986  Sheet 1 of 2  4,565,025
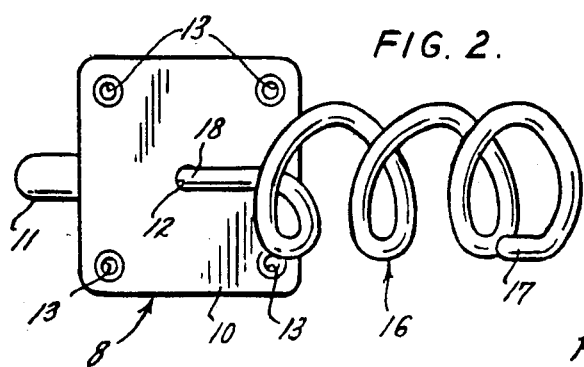
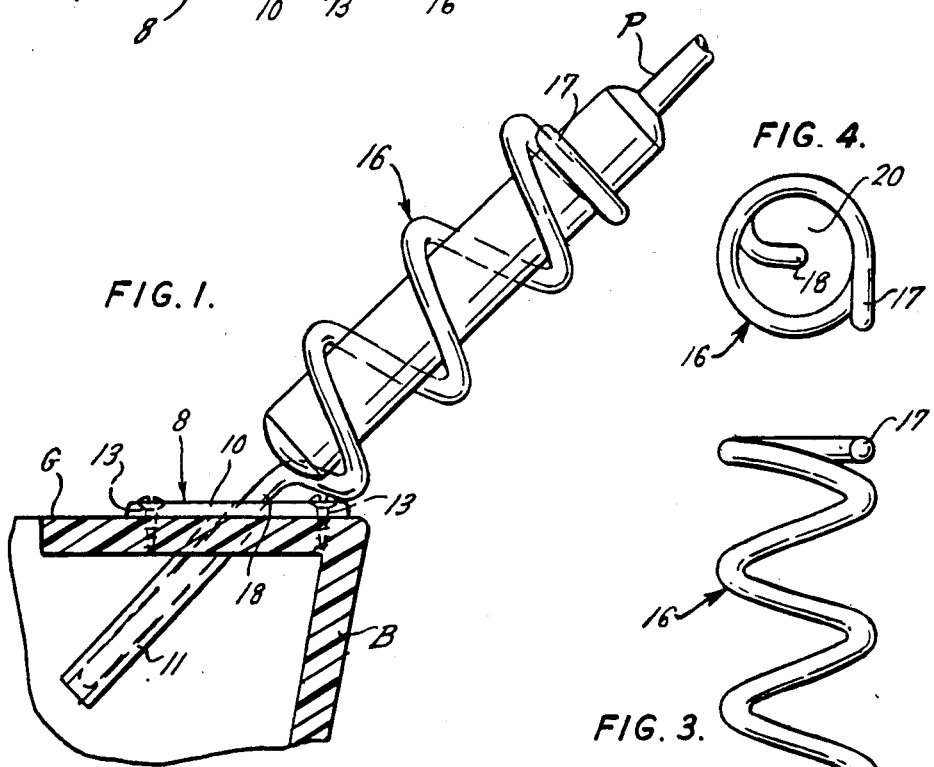
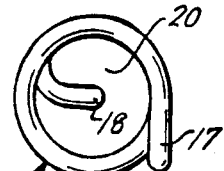
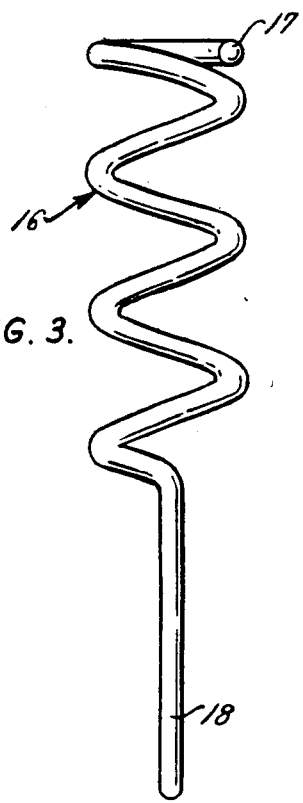
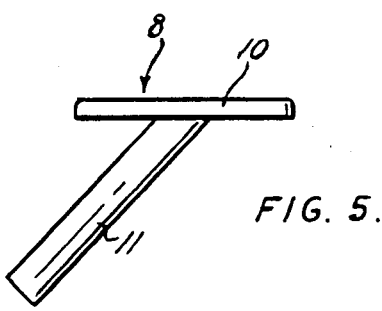

FISHING POLE MOUNT

The present application is a continuation-in-part-of application Ser. No. 06/481,839 filed Apr. 4, 1983.

DESCRIPTION OF THE INVENTION

The invention comprises essentially two elements. One of them is a helically coiled rod providing an axis opening to receive and hold the handle of a fishing rod. This helical rod has a shank at the end that can fit into a socket fixture that can be received by screws onto the gunwale of a boat. The socket comprises a flat plate preferalby of metal, to the underside of which a tube is attached. The socket opens through the plate. This tube is adapted to receive the projecting shank on the end of the helical rod. Because of the flat nature of the fitting and its small size without projecting substantially above the gunwale of the boat, it does not mar the boat or act to snag articles moved across it when the coil is not in place. Also, several such fittings can be supplied around the boat wherever desired, so that more than one fishing pole can be employed in several different places, or several poles can be held at the same time, all without interfering with the normal use of the boat or without snagging the clothing, arms or hands of the users.

The helical coil holder is like one that has been used heretofore for bank fishing but with the shank very much shortened so that it can be used in the fitting in the gunwale of the boat. This combination of the helical coil with a short shank and the small flat fitting is an important feature of this invention. Also the flat part of the fitting is large enough to receive the lower parts of the helical coil and prevent the coil from scratching the boat.

The helical coil pole holder should extend at an angle to the vertical. In one construction, the socket extends vertically and the shank of the helical coil is bent to provide the angle. In the other construction, the shank remains coaxial with the helix but the tube of the socket is at an angle to the vertical. In either case, the shank may have a lug extending from its side at approximately the level at which the shank is properly disposed within the socket for maximum security. This lug is adapted to engage in any of one or more radially extended notches in the socket plate so that the holder helix coil cannot rotate about the axis of the socket. This is especially valuable where the socket is vertical. This arrangement also limits the descent of the shank into the socket and thereby holds the pole up off of the gunwale of the boat.

IN THE DRAWINGS

FIG. 1 is a side elevation partly in section showing the device as mounted to hold a fishing pole on a boat;

FIG. 2 is a plan view of the device itself;

FIG. 3 is an elevation of the fish pole holding coil;

FIG. 4 is a top plan view of the coil shown in FIG. 3;

FIG. 5 is a side elevation of the fitting having the socket;

DESCRIPTION OF PREFERRED EMBODIMENT

Figure 6:
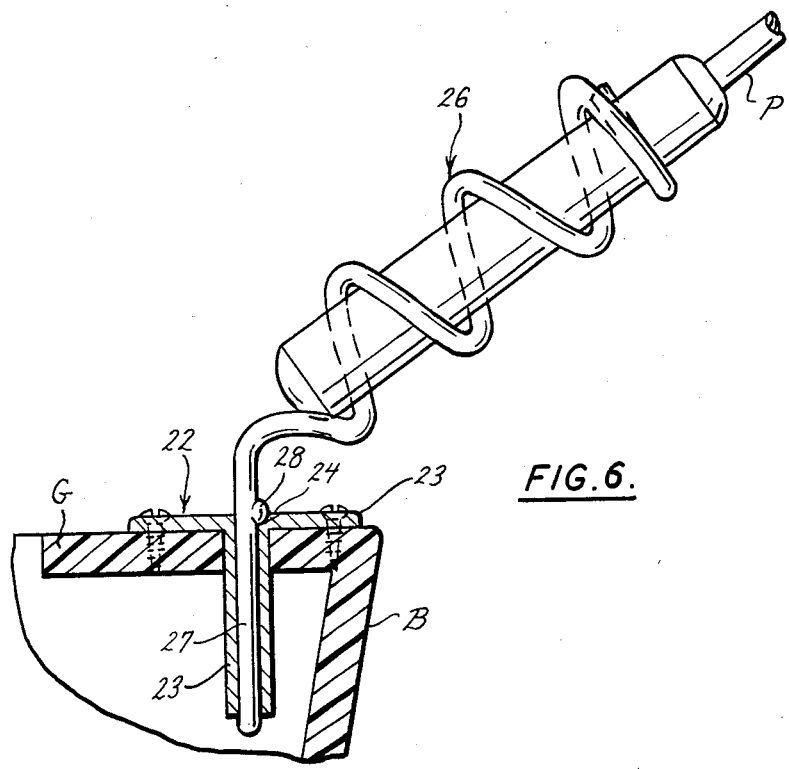
FIG. 6 is a view similar to FIG. 1 showing the socket to be vertical and the shank to be bent.

In the drawings a fitting 8 is shown in the stern of a boat (B) so that the fishpole (P) can stand upwardly and outwardly from the boat. The fitting 8 comprises a metal face plate 10 having firmly attached to it a rigid tube 11 that projects downwardly below the plate in the embodiment, at an angle. The plate has a hole 12 that is of the same size as the opening of the tube 11. The plate also as four screwholes 13 to receive countersunk screws by means of which it can be attached to the gunwales of a boat. The only necessary effect on the boat is to have a hole through the gunwale (G) of the boat at a slope to accept the tube 11.

The pole holding helical coil 16 is shown separately. The helix has a transverse loop 17 and a shank 18 at its inner end. The opening 20 that is provided axially through the helix is of a size to receive comfortably the handle of the pole (P).

Figure 7:
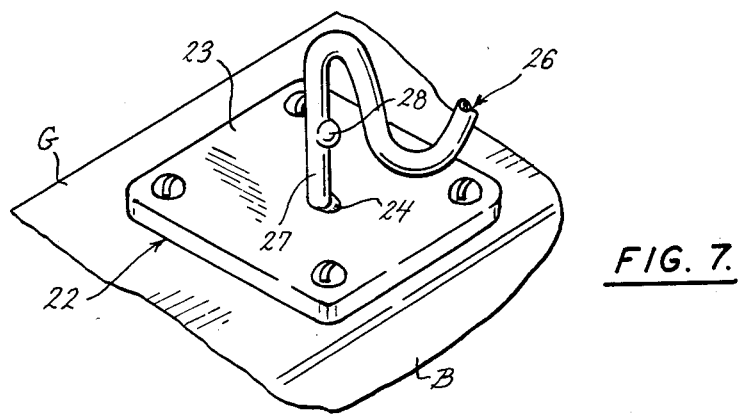
FIG. 7 is a view of the socket with the end of the shank elevated somewhat from it to show the lug on the side of the shank and the notch in the socket plate.

In the modification of FIGS. 6 and 7, the fitting is shown at 22 and consists of a plate 23 similar to the plate 10 of the first embodiment. However, the socket 23 extends down vertically instead of at an angle as before. The plate is adapted to be held down by screws as before. The socket is shown as having a notch 24 extending, in this case, outwardly to enlarge the upper part of the socket on one side. The notch 24 extends downwardly only so far for a purpose to appear. Other notches may be provided for other orientations of the pole.

The helical pole holder coil 26 and has a shank 27, at an angle to the helical axis. This shank is adapted to fit into the socket. As shown, the shank has a lug 28 struck out from it radially on one side, here the side facing the same direction as does the helix. This lug 28 is adapted to engage in the notch 24 of the socket plate. When so engaged, it prevents the turning of the helix and hence the fishpole therein, about the axis of the socket. It also limits the descent of the shank into the socket and thereby can hole the pole holder above the gunwale of the boat and prevent its injury to the gunwale in the event it moves at all.

In use the fitting 10 or 22 is located as desired around the gunwale of the boat and screwed into place. When there, it does not project substantially above the gunwales and has no projections that could snag the hand or arms of the users or any other items that pass over it, so long as the coil 16 is not in place. The shank of the coil 16 or 26 is readily insertable into the fitting 10 or 22, as the shank fits comfortably through the hole into the tubular socket member. The coil can be twisted until it is stable in such position. The plate 10 or 22 is large enough to be engaged by the innermost coil of the helix 16 or 26, to prevent the helix from scratching the boat. The fishing pole (P) can be inserted into the coil 16, and be held projecting outwardly in position for use in fishing.

Typical sizes of the parts provide a metal coil 16 about 11 centimeters in axial dimension, and about 43 millimeters in external diameter. The shank is approximately 8 centimeters long and the coil is preferably made of round stock approximately 6 millimeters in diameter. The plate 10 may be made of stock approximately 3 millimeters thick and about 57 millimeters on the side. The tubular projection 11 is around 9 millimeters external diameter and approximately 7 millimeters internal diameter. The length of the tube is approximately 75 millimeters.

When not in use with a fish pole (P) the coil 16 may be taken out leaving the gunwale substantially flat. It is particularly desirable to have such a unobstructing fitting because a number of them can be located around the gunwales of the boat or other parts of the boat without projecting in a way that would snag the users of the boat or their equipment. Also it enables a number of fish poles to be mounted at the same time, or a single pole to be placed in different positions. All of this is in contrast to former fishpole mountings that have been used in deep sea fishing where there is a socket projecting above a base and usually swiveled. The present device is also very inexpensive and does not offer any objectionable appearance to the boat.

What I claim is:

1. An arrangement for holding fishing poles and the like comprising: a holder for a pole that provides an elongated opening to receive and surround the handle of the pole, the holder having a shank extending therefrom, and a fitting to be secured to a boat or the like and to receive and secure the holder thereto, the fitting comprising a flat plate and a projecting tube secured to the under side of the plate and extending downwardly therefrom, the plate having a hole through it aligned with the opening through the tube, the angle of the tube to the plate and the angle of the shank to the axis of the holder being such as to dispose the holder and a pole therein at an angle to the plate, the arrangement being such that the shank of the holder can be removably inserted into the tube through the hole and be held there with its axis projecting upwardly and outwardly, the fitting being substantially flat to the upper surface upon which it is mounted so that when the holder is removed therefrom, there is no substantial obstruction produced by the fitting, the holder comprising a helical coil at a fixed acute angle with the shank, and said shank depending therefrom just sufficiently far to stabilize the holder when holding a pole onto the boat, and a lug and notch arrangement for interengagement between the shank and the plate to limit descent of the shank into the socket and to limit rotation of the shank in bracket, the lug being a single nub-like element formed integrally with the material of the shank extending laterally from one side of said shank, and a single notch being formed in the plate adjacent the upper surface thereof and extending downwardly thereinto only so far as to receive the lug and thereby to limit the descent of the shank into the socket.

* * * * *